US007882195B2

(12) United States Patent  
Kirkland et al.

(10) Patent No.: US 7,882,195 B2  
(45) Date of Patent: Feb. 1, 2011

(54) INSTANT MESSAGING PRIORITY FILTERING BASED ON CONTENT AND HIERARCHICAL SCHEMES

(75) Inventors: Dustin C. Kirkland, Austin, TX (US); Richard J. McCarty, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 12/342,040

(22) Filed: Dec. 22, 2008

(65) Prior Publication Data

US 2009/0100141 A1    Apr. 16, 2009

(51) Int. Cl.  
*G06F 15/16* (2006.01)

(52) U.S. Cl. .................. 709/207; 709/205; 709/206

(58) Field of Classification Search ................ 709/205, 709/206, 207  
See application file for complete search history.

(56) References Cited

U.S. PATENT DOCUMENTS

| | | | |
|---|---|---|---|
| 5,617,541 | A | 4/1997 | Albanese et al. |
| 5,995,940 | A | 11/1999 | Ramaley |
| 6,212,548 | B1 | 4/2001 | DeSimone et al. |
| 6,301,609 | B1 | 10/2001 | Aravamudan et al. |
| 6,392,997 | B1 | 5/2002 | Chen |
| 6,430,602 | B1 | 8/2002 | Kay et al. |
| 6,430,604 | B1 | 8/2002 | Ogle et al. |
| 6,484,196 | B1 | 11/2002 | Maurille |
| 6,493,703 | B1 | 12/2002 | Knight et al. |
| 6,510,458 | B1 | 1/2003 | Berstis et al. |
| 6,557,027 | B1 | 4/2003 | Cragun |
| 6,594,693 | B1 | 7/2003 | Borwankar |
| 6,778,941 | B1 | 8/2004 | Worrell et al. |
| 6,832,245 | B1 | 12/2004 | Isaacs et al. |
| 6,961,720 | B1 | 11/2005 | Nelken |
| 6,964,040 | B2 | 11/2005 | Osborn |
| 6,981,223 | B2 | 12/2005 | Becker et al. |
| 7,007,085 | B1 | 2/2006 | Malik |
| 7,016,978 | B2 | 3/2006 | Malik et al. |
| 7,039,677 | B2 | 5/2006 | Fitzpatrick et al. |
| 7,099,855 | B1 | 8/2006 | Nelken et al. |
| 7,121,003 | B2 | 10/2006 | Yasumura et al. |
| 7,124,123 | B1 | 10/2006 | Roskind et al. |
| 7,124,372 | B2 | 10/2006 | Brin |
| 7,142,664 | B2 | 11/2006 | Seligmann |
| 7,174,453 | B2 | 2/2007 | Lu |
| 7,185,057 | B2 | 2/2007 | Brown et al. |
| 7,200,634 | B2 | 4/2007 | Mendiola et al. |

(Continued)

*Primary Examiner*—Michael Won  
(74) *Attorney, Agent, or Firm*—Yee & Associates, P.C.; Jeffrey S. LaBaw

(57) ABSTRACT

A method, apparatus, and computer instructions for filtering and prioritizing instant messaging threaded conversations in an instant messaging system based on thread content. The instant messaging client analyzes an incoming message to determine the thread subject. Based on the thread subject analysis, the client determines the priority level associated with the incoming message. The message is then delivered and displayed to the recipient according to the priority level. The present invention also allows a participant initiating a thread of conversation to override filter settings on a messaging client. The authority to override settings may be predicated on an external list, such as a corporate telephone directory. As a result, the participant, having some authority or rights to override the recipient's instant messaging settings, may be allowed to conduct a messaging session with the recipient.

24 Claims, 5 Drawing Sheets

U.S. PATENT DOCUMENTS

| | | | |
|---|---|---|---|
| 7,200,635 B2 | 4/2007 | Yashchin et al. |
| 7,383,307 B2 | 6/2008 | Kirkland et al. |
| 7,412,491 B2 | 8/2008 | Gusler et al. |
| 7,475,110 B2 | 1/2009 | Kirkland et al. |
| 7,480,696 B2 | 1/2009 | Kirkland et al. |
| 2001/0003202 A1 | 6/2001 | Mache et al. |
| 2002/0007398 A1 | 1/2002 | Mendiola et al. |
| 2002/0082484 A1 | 6/2002 | Baba et al. |
| 2002/0083134 A1 | 6/2002 | Bauer, Jr. et al. |
| 2002/0087649 A1 | 7/2002 | Horvitz |
| 2003/0009495 A1 | 1/2003 | Adjaoute |
| 2003/0018726 A1 | 1/2003 | Low et al. |
| 2003/0023684 A1 | 1/2003 | Brown et al. |
| 2003/0045311 A1 | 3/2003 | Larikka et al. |
| 2003/0046421 A1 | 3/2003 | Horvitz et al. |
| 2003/0131055 A1 | 7/2003 | Yashchin et al. |
| 2003/0131064 A1 | 7/2003 | Bell, III et al. |
| 2004/0024822 A1 | 2/2004 | Werndorfer et al. |
| 2004/0039786 A1 | 2/2004 | Horvitz et al. |
| 2004/0078445 A1 | 4/2004 | Malik |
| 2004/0143636 A1 | 7/2004 | Horvitz et al. |
| 2004/0158610 A1 | 8/2004 | Davis et al. |
| 2004/0181577 A1 | 9/2004 | Skurikhin et al. |
| 2005/0108332 A1 | 5/2005 | Vaschillo et al. |
| 2005/0149621 A1 | 7/2005 | Kirkland et al. |
| 2005/0228864 A1 | 10/2005 | Robertson |
| 2006/0248150 A1 | 11/2006 | Chaar et al. |
| 2007/0005703 A1 | 1/2007 | Vesterinen |
| 2008/0183832 A1 | 7/2008 | Kirkland et al. |
| 2008/0250335 A1 | 10/2008 | Gusler et al. |
| 2008/0250336 A1 | 10/2008 | Gusler et al. |
| 2009/0083389 A1 | 3/2009 | Kirkland et al. |

INSTANT MESSAGING PRIORITY FILTERING BASED ON CONTENT AND HIERARCHICAL SCHEMES

CROSS REFERENCE TO RELATED APPLICATIONS

The present invention is related to applications entitled "Method and Apparatus for Enhancing Instant Messaging Systems", Ser. No. 10/427,137, filed on Apr. 10, 2003; "Method and Interface for Multi-Threaded Conversations in Instant Messaging", Ser. No. 10/752,917, filed on Jan. 7, 2004; and "Instant Messaging Windowing for Topic Threads", Ser. No. 10/752,804, filed on Jan. 7, 2004. The above related applications are assigned to the same assignee, and incorporated herein by reference.

This application is a continuation of application Ser. No. 10/752,919, filed Jan. 7, 2004, status allowed.

BACKGROUND OF THE INVENTION

1. Technical Field

The present invention relates generally to an improved data processing system and in particular, to a method, apparatus, and computer instructions for processing and displaying messages. Still more particularly, the present invention provides an improved method, apparatus, and computer instructions for filtering and prioritizing instant messaging threaded conversations in an instant messaging system based on thread content.

2. Description of Related Art

Instant messaging is an online chat medium, allowing users to communicate with each other and to collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality and usability enhancements are important to the continued success of this type of communication tool.

Current instant messaging systems allow a user to selectively block one or more users from conducting a messaging session with the user. A user may block messages from being displayed in his/her messaging window based on the sender's messaging address. This capability is convenient when a particular user or group of users are illegitimately requesting the receiver's attention. Additionally, spam-filtering techniques for email communications currently exist that identify keywords and block incoming email when the content therein surpasses some allowable threshold.

However, as current messaging systems offer message blocking based on the sender's messaging address, a user must set up the filtering system based on the sender, rather than the content of the message. The problem with present instant messaging technology is that once a user has blocked a potential participant from conducting a session, that participant is permanently disabled from conducting a session with the user, regardless of the content of the session.

Therefore, it would be advantageous to have an improved method, apparatus, and computer instructions for filtering and prioritizing instant messaging threaded conversations in an instant messaging system based on thread content.

The present invention provides a method, apparatus, and computer instructions for filtering and prioritizing instant messaging threaded conversations in an instant messaging system. The present invention allows a user to configure an instant messaging system to filter and prioritize incoming messages based on thread content.

When an instant message is sent to a user, the receiving instant messaging client performs an analysis on the thread subject of the incoming message. The instant messaging client analyzes the message to determine the thread content of the message. The priority level of the message is determined based on the thread content of the message. If the priority level of the message is above a set threshold, the instant messaging client accepts message. The message is then displayed at the instant messaging client according to the priority level.

In addition, the present invention overcomes problems associated with blocking messages in current instant messaging systems by allowing a participant, in certain circumstances, to override the filtering and priority settings on a user's instant messaging system. The participant, having some authority or rights to override the user's instant messaging settings, may be allowed to conduct a messaging session with the user. The authority to override settings may be predicated on the establishment of an organizational hierarchy based on the user's selection. For example, the user may establish a family hierarchy, wherein access rights to override a user's messaging settings are assigned to members of the user's family according to the hierarchy. Likewise, the user may establish a friend hierarchy, designating friends as "close friends", "acquaintances", and the like, and assign access rights accordingly. Alternatively, the authority to override settings may be predicated on an external source, such as a corporate telephone directory. A corporate telephone directory has inherent properties regarding organizational structure, such as employee and employer relationship, manager and subordinate relationship, and hierarchical relationship.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
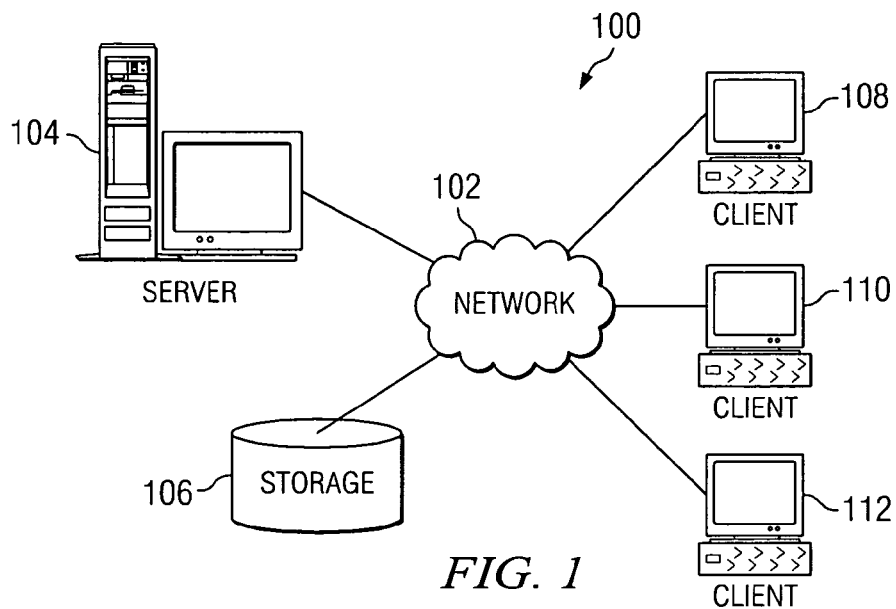
FIG. 1 depicts a representation of a network of data processing systems in which the present invention may be implemented.

With reference now to the figures, FIG. 1 depicts a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers or personal digital assistants (PDA) devices. In the depicted example, server 104 provides data, such as boot files, operating system images, and applications to clients 108-112. Clients 108, 110, and 112 are clients to server 104. Server 104 may act as an instant messaging server to facilitate the exchange of messages between users at clients, such as clients 108, 110, and 112. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
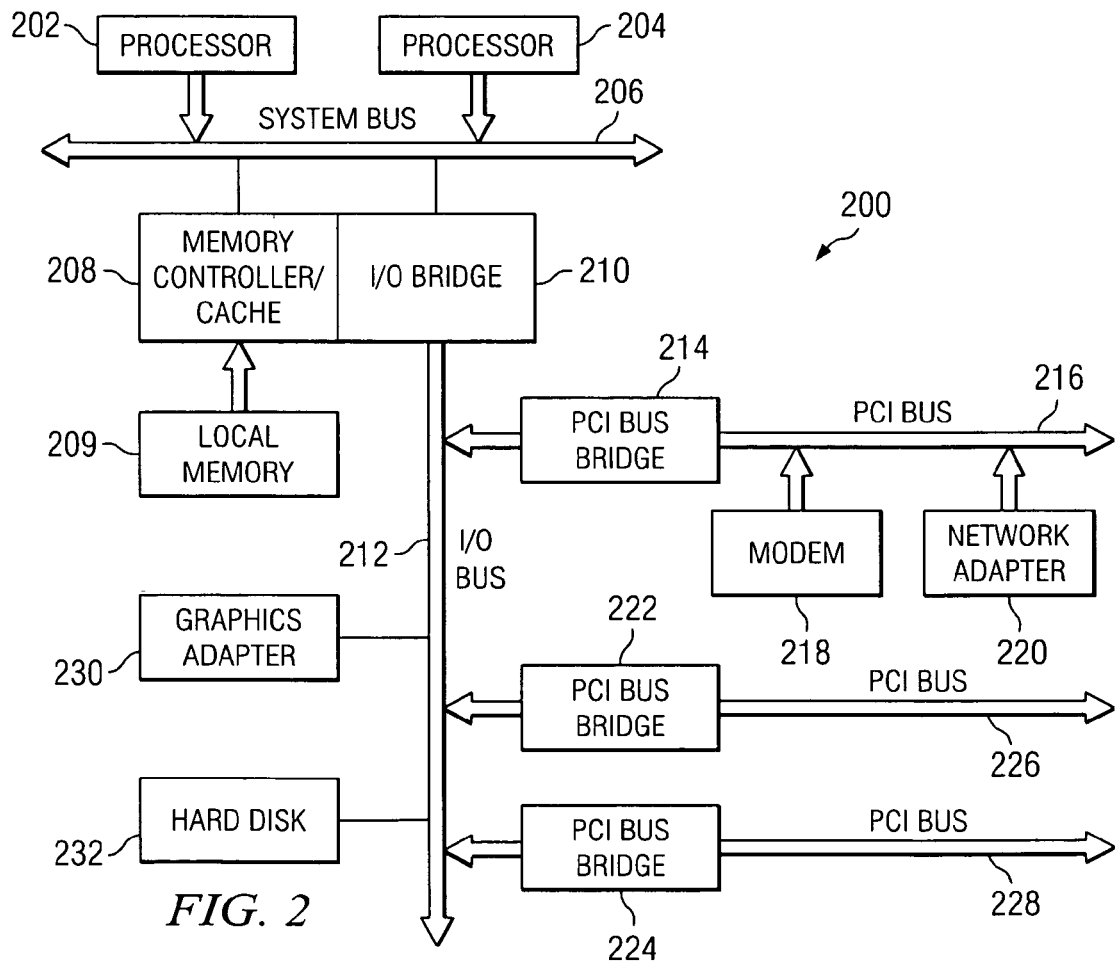
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
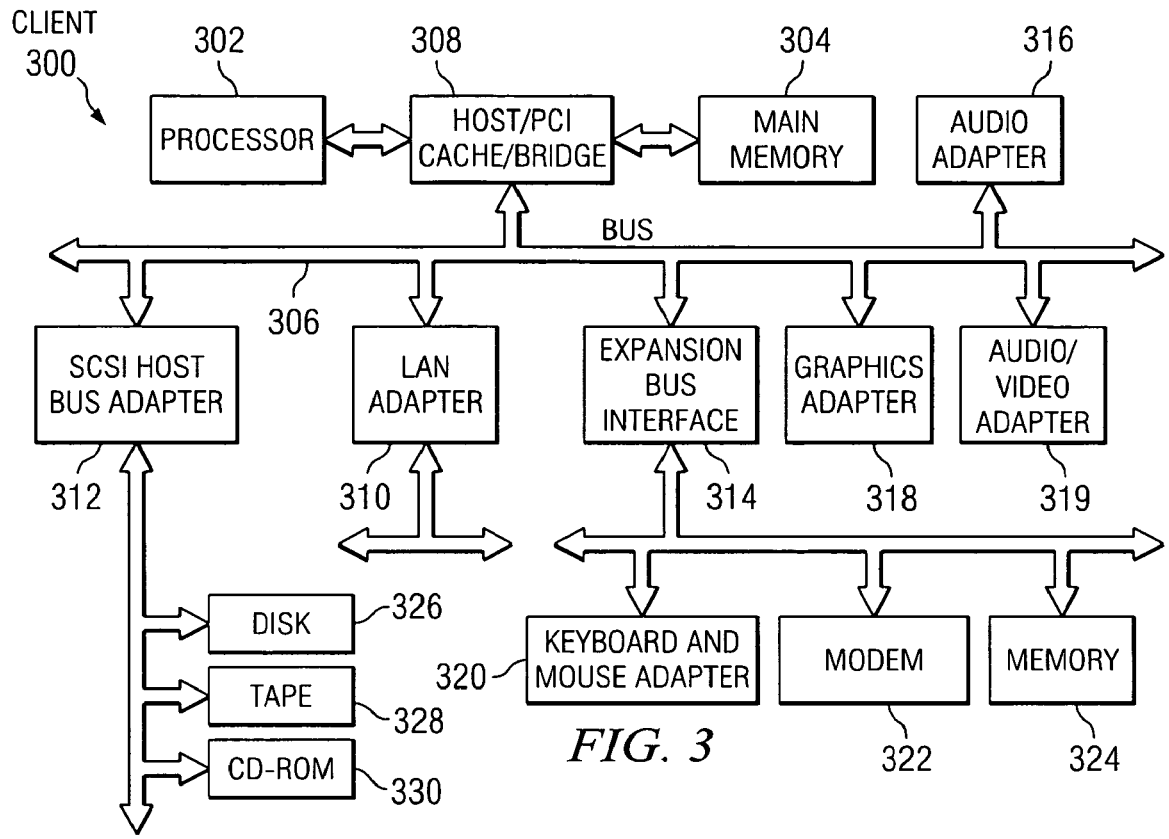
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3.

Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for filtering and prioritizing instant messaging threaded conversations in an instant messaging system based on thread content. In current instant messaging systems, a user may block a participant from conducting a messaging session with the user based on the participant's messaging address. The present invention overcomes problems associated with blocking participants in current instant messaging sessions by allowing a user to filter messages based on message content in addition to filtering messages based on a participant's messaging address. The present invention also provides for prioritizing messages based on the thread content (i.e., conversational subject of the message), so that an incoming message is displayed according to the priority level of the message.

When an instant message is sent to a user, the receiving instant messaging client performs an analysis on the thread subject of the incoming message. The sender or recipient may manually set the thread subject of the message, and the client may determine the thread content by checking the message header information. Alternatively, the client may automatically determine the thread subject using artificial intelligence or semantic analysis or other means known to the art to analyze the message content. This determination is performed prior to the final delivery and display of the message. Based on the thread subject analysis, the client determines the priority level associated with the incoming message.

Furthermore, the priority level may be manually configured by the message sender or the recipient. The incoming messages are then accepted and displayed according to the priority level of the messages. For example, a user may create several different thread queues. Any messages that contain, for example, "Linux", "Security", or "Kernel" may be delivered to a "Primary Work" queue of messages. Any messages that contain "IPL", "Patent", or "Prior art" are delivered to a "Secondary Work" queue of messages. Any messages containing "Lunch" or the names of the user's spouse or children are delivered to a "Personal" queue. The user may also set priority levels for each of the queues, as well as setting a current threshold for each queue. Messages delivered to queues below a current threshold remain in a queue without notification. Messages delivered to a queue at or above a current threshold may use known techniques to grab the user's attention, such as flashing messages, changing window focus, and the like.

In addition, the present invention overcomes problems associated with blocking messages in current instant messaging systems by allowing a participant in certain circumstances to override filter settings on another user's instant messaging system. The participant, having some authority or rights to override the user's instant messaging settings, may be allowed to conduct a messaging session with the user. The authority to override settings may be predicated on the establishment of an organizational hierarchy based on the user's selection, such as a family relationship hierarchy or a friend relationship hierarchy. Alternatively, the authority to override settings may be predicated on an external source, such as a corporate telephone directory. A corporate telephone directory has inherent properties regarding organizational structure, such as employee and employer relationship, manager and subordinate, and hierarchical relationship, or any combination of these user-defined hierarchies.

Furthermore, the filtering and prioritizing features of the present invention may also be applied in combination. The instant messaging system may be configured to provide for allowing the delivery of an instant message based on thread content, as well as allowing the delivery of the instant message based on a priority scheme. For example, if a party designated as a "close friend" in a friend relationship hierarchy initiates a discussion thread having content not in the allowed range of discussion, the message would be filtered from delivery if the user's instant messaging system contains a first filter based on message content and secondary filter based on the friend's access rights.

Figure 4:
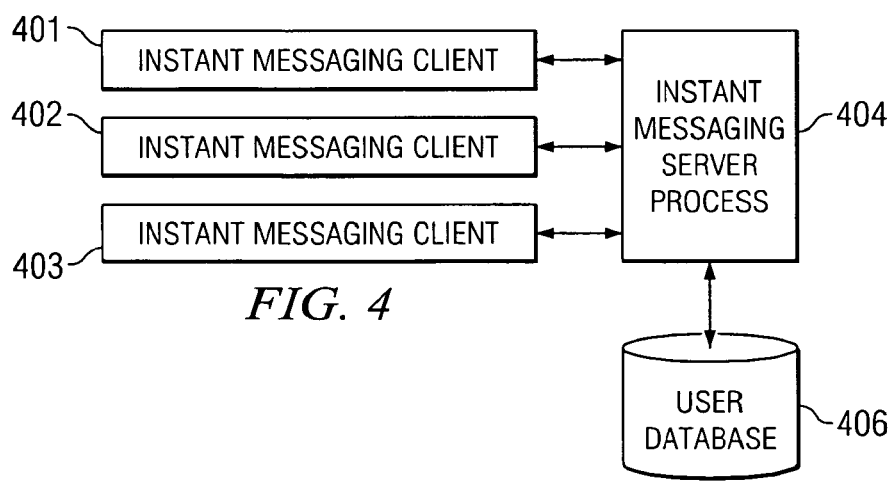
FIG. 4 is a block diagram illustrating components used in managing messages in accordance with a preferred embodiment of the present invention.

Turning now to FIG. 4, a block diagram illustrating components used in an instant messaging system in accordance with a preferred embodiment of the present invention is shown. In this illustrative example, a user at instant messaging client 401 may send or exchange messages with other users at instant messaging clients 402 and 403. These instant messaging clients may be executing on a data processing system, such as data processing system 300 in FIG. 3. The exchange of messages in these examples is facilitated through instant messaging server process 404. This process allows for users to find other users within the instant messaging system as well as aid in the exchange of messages between different users.

Depending on the particular instant messaging system, instant messaging server process 404 may only be involved in providing an indication of when particular users are online and for establishing initial contacts while users contacting users already on a buddy list may contact those users directly after seeing that a particular user is online. Instant messaging server process 404 may be located on a server, such as data processing system 200 in FIG. 2.

In these examples, the different users registered to the instant messaging system are stored in user database 406. This user database provides information needed to search for and find other users as well as contact users when they are online.

Figure 5:
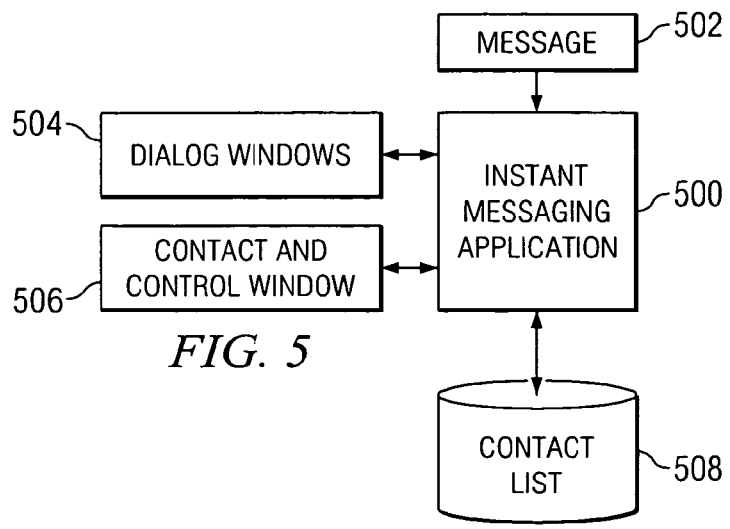
FIG. 5 is a block diagram illustrating an instant messaging client in accordance with a preferred embodiment of the present invention.

Turning next to FIG. 5, a diagram illustrating an instant messaging client is depicted in accordance with a preferred embodiment of the present invention. The components illustrated in FIG. 5 may be found in an instant messaging client, such as instant messaging client 401, 402, or 403 in FIG. 4. These components may be implemented in a data processing system, such as data processing system 300 in FIG. 3.

In the illustrative example, instant messaging application 500 processes messages, such as message 502, received from users located on remote data processing systems. As messages are received, these messages are presented in dialog windows 504. Additionally, dialog windows 504 provide an interface for a user to input text to send messages to other users.

Contact and control window 506 is presented by instant messaging application 500 to provide the user with a list of user names, as well as other information. Contact and control window 506 also provides an interface to allow a user to set different preferences. For example, the user may set passwords required to access different names used in instant messaging sessions.

Also, a user may employ contact and control window 506 to set other preferences, such as colors and fonts used in instant messaging application 500. These preferences also may include whether a picture is to be sent when a session is initiated with another user. Depending on the implementation, the preference may be set to allow a user who receives messages to retrieve images of the senders from a remote database or a local cache.

Further, a list of names presented by contact and control window 506 are stored in contact list 508 in these examples. Additional user or screen names may be added to or deleted from contact list 508. This contact list is employed in presenting the list of names within contact and control window 506.

In a preferred embodiment of the invention, a user may prefer to receive and display incoming messages when the messages contain specific subject content. For example, when a user is at work, the user may prefer to only accept incoming messages when the message's subject contains a business-related thread of conversation. The user may likewise want to filter incoming messages from normally acceptable users when those messages contain conversations of a personal nature. Conversely, a user who has retired for the day may choose to filter messages containing business conversations, while accepting messages containing personal conversations. The message's thread subject is considered by the receiving instant messaging client before final delivery and display of the message at the receiving client. Thus, the thread content of an incoming message is used in determining whether to accept the message and how to display the message to the recipient.

Figure 6:
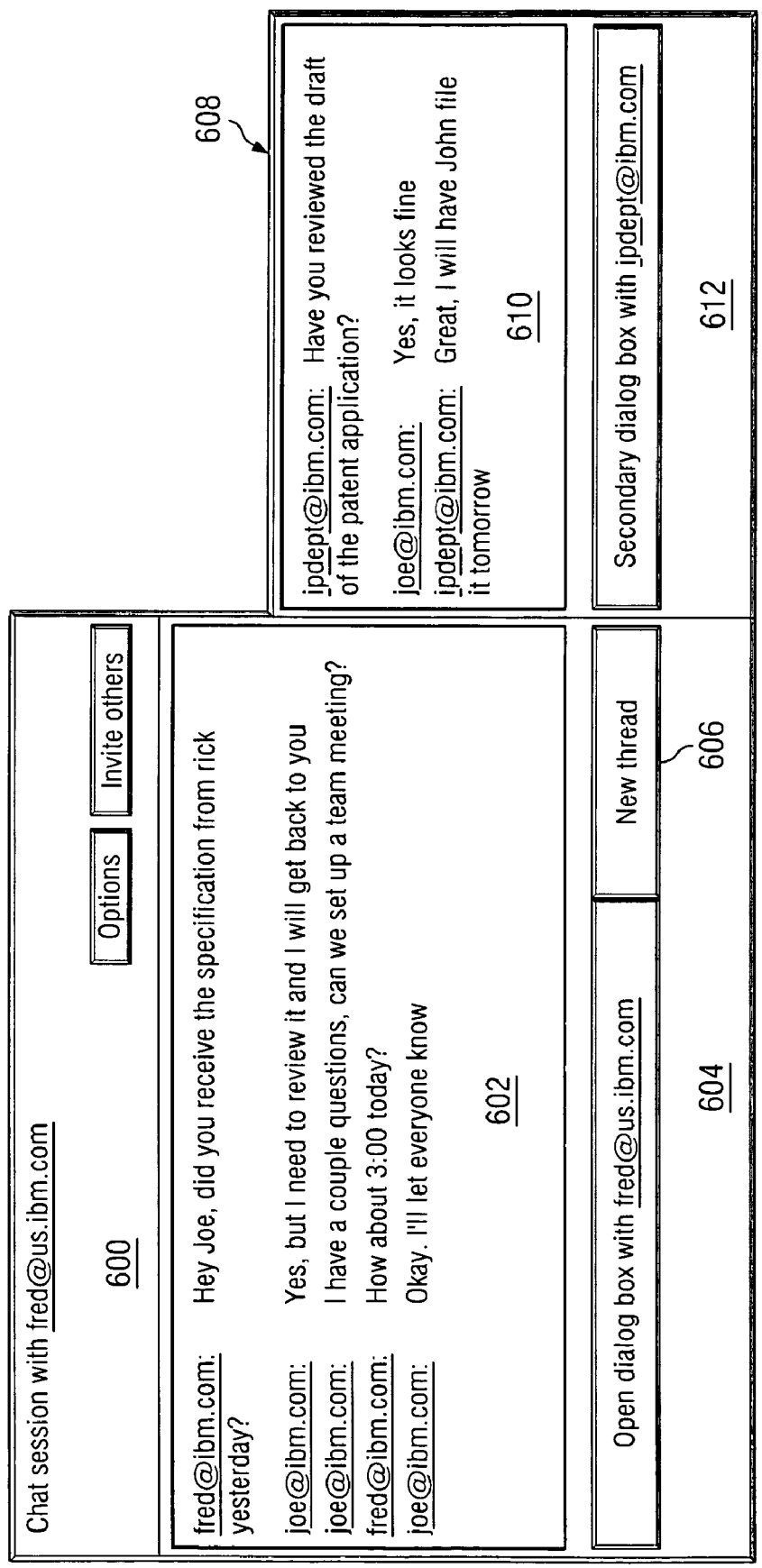
FIG. 6 is a diagram of a messaging window for providing enhanced filtering and prioritizing of instant messages based on thread content in accordance with a preferred embodiment of the present invention.

With reference now to FIG. 6, a diagram of a messaging window for providing enhanced filtering and prioritizing of instant messages based on thread content is depicted in accordance with one embodiment of the present invention. In this example, messaging window 600 is an example of a messaging window within dialog windows 504 in FIG. 5. Messaging window 600 is presented for purposes of illustration and not meant as a limitation as to how messages may be presented. Messaging window 600 is displayed when a message is received from another user.

In this example, messaging window 600 is a primary messaging window displaying all communication for a messaging session. In this example, the discussion thread is located in ongoing conversation pane 602. This section shows communications from both parties. Outgoing message pane 604 contains input from the user that is sent to the other user at a remote data processing system. Outgoing message pane 604 is used to hold a current reply, but is emptied as soon as that reply is sent to the recipient. New thread button 606 is included to allow for the management of more than one thread of conversation within an instant messaging session.

Instant messaging client, such as instant messaging application 500 in FIG. 5, determines whether to accept an incoming message and how to display the message in messaging window 600 by first analyzing the thread subject of the message. The message is analyzed to determine the priority order associated with the incoming message. The priority order may be manually set by the message sender or the recipient. For example, a recipient may increase a sender's priority for a period of time if, for instance, the two parties are working on an important project together. In contrast, the recipient may decrease a given sender's priority if, for instance, the recipient is busy on more important issues. The sender may try to set the priority of the message, which may or may not be respected by the recipient (i.e. the recipient may able to override or ignore priority levels and thread subjects as defined by the sender).

A user may configure his instant messaging client to prioritize incoming messages based on the thread content. For example, a typical user, Joe, is currently occupied at work with a business-related technical problem. Joe is interfacing with various team members debugging an issue with his source code for a new SuperSolution product, as shown in ongoing message pane 602. Joe is also expecting a draft of a patent application from the intellectual property (IP) law department. In the meantime, another user, Jane, is about to contact Joe regarding mowing the lawn after work and picking up groceries on the way home. Joe may configure his instant messaging client to unconditionally accept messages regarding his SuperSolution project (priority 1), accept messages from the IP law department, but place them in a secondary window (priority 2), and queue personal messages, such as the one regarding his lawn (priority 3) for later delivery.

As described above, messages related to the SuperSolution project have the highest priority, and are unconditionally accepted by the instant messaging client. These messages are displayed in ongoing message pane 602. Messages related to the patent application are given a lower priority (priority 2), but are still accepted by the instant messaging client. However, these messages are not presented to the user in the main conversation window, but rather displayed in secondary window 608. In this second window, a second, lower-priority discussion thread is presented in ongoing message pane 610 of window 608. The user input is entered into outgoing message pane 612. Outgoing message pane 612 is used to hold a current reply, but is emptied as soon as that reply is sent to the recipient.

Messages related to mowing the lawn are configured to have a priority level below a delivery threshold. In other words, the user may configure the instant messaging client to delay delivery of messages having a priority level below a certain threshold. The client software may be configured to maintain a database of delayed messages. Alternatively, the delayed messages may be appended to their appropriate queues, however, the user must manually view those queues or lower his or her priority threshold. Additionally, the message may be delivered, but display schemes such as using flashing messages to catch the user's attention may be delayed. Joe may configure these low priority messages to be delivered at a later time when Joe has lowered the delivery threshold. Thus, Joe is able to reorder incoming messages according to content priority, and allow/disallow interrupts along the lines of those priorities.

As can be seen, the filtering and prioritizing mechanism of the present invention illustrated in FIG. 6 provides an ability to filter different threads of conversation and display them to the user according to content priority. Of course, other windows may be opened for other priority levels, even though only two windows are illustrated in FIG. 6.

As mentioned above, messaging window 600 displays incoming messages according to priority level. The user may manually configure the instant messaging client and assign various priority levels to each thread of conversation. Alternatively, artificial intelligence may be used to automatically determine the thread content of the message. When a messaging session is initiated, a tag indicating the priority level of the message is stored in the header information of the incoming message. The information stored in the header is used to determine how the message will be delivered to the recipient, as well as how the message will be displayed in messaging window 600.

For example, if the header information contains a tag indicating that the incoming message has a priority level of 1, the message is accepted and displayed in messaging window 600 in a manner to capture the attention of the recipient, such as within main ongoing conversation pane 602. If the header information contains a tag indicating that the incoming message has a lower priority level, but still above the delivery threshold, the message is accepted and displayed within another window, such as secondary window 608. If the header information contains a tag indicating that the incoming message has a priority level below the delivery threshold, the delivery of the message to the recipient is delayed until a later time when the recipient lowers the delivery threshold.

Depending on the particular implementation, instead of opening an additional messaging window for each thread of conversation and reordering the display of each messaging window based the priority levels, the incoming messages may all be displayed in the same messaging window regardless of thread content. Various organization schemes may also be used to differentiate the messages based on the priority level assigned to the messages, such as using different icons for the messages to indicate priority 1, 2, 3, etc., assigning each message a different color or using highlighting to reflect the assigned priority levels for each message. In order to draw the user's attention to higher priority messages, other schemes such as flashing messages may be used to capture the user's attention. In this manner, a user may easily discern which messages are of a higher priority than others received during an instant message session.

Figure 7:
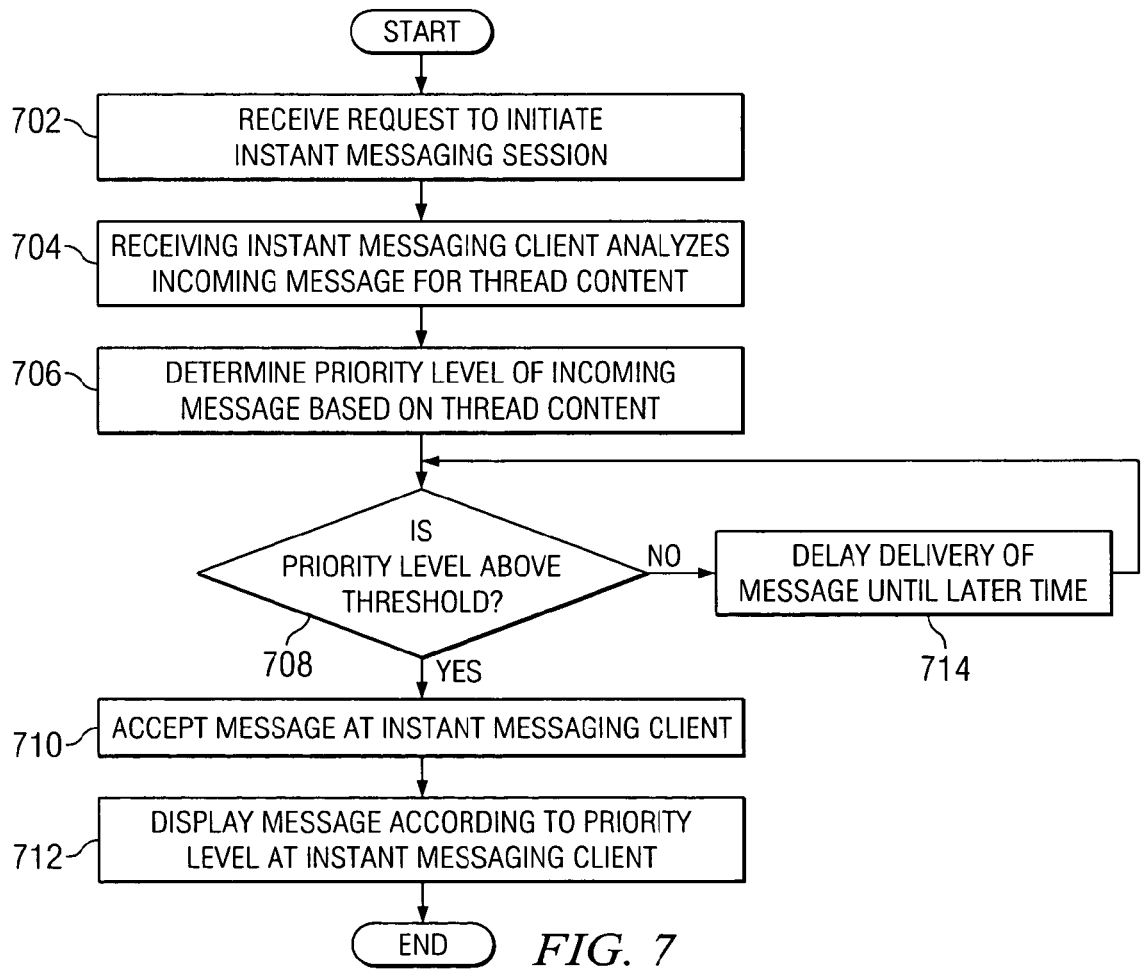
FIG. 7 is a flowchart of a process for filtering and prioritizing instant messaging threaded conversations based on thread content in accordance with a preferred embodiment of the present invention.

Turning next to FIG. 7, a flowchart of a process for filtering and prioritizing instant messaging threaded conversations based on thread content is depicted in accordance with a preferred embodiment of the present invention. The process illustrated in FIG. 7 may be implemented in an instant messaging application, such as instant messaging application 500 in FIG. 5.

The process begins by receiving a request for initiating an instant messaging session (step 702). Next, the receiving instant messaging client performs an analysis on the thread subject of the incoming message (step 704). This analysis is performed prior to the final delivery and display of the message. The instant messaging client then determines the priority level associated with the thread content of the message (step 706). If it is determined that the priority level of the message is above a set threshold (step 708), the message is accepted by the receiving instant messaging client (step 710), and displayed in the messaging window of the client according to the priority level (step 712). Turning back to step 708, if the priority level of the message is determined to be below the set threshold, the delivery of the message to the client is delayed until a later time (step 714), such as when the delivery threshold is lowered to accommodate the delayed message's priority level.

In some circumstances, however, a filtered participant, having some authority or rights to override the user's instant messaging settings, may conduct a messaging session with the user, despite the messaging filters set by the recipient. The authority to override settings may be predicated on the establishment of an organizational hierarchy based on a user selection or on an external list, such as a corporate telephone directory. In this manner, an advantage is provided over current instant messaging systems by allowing a participant to override a filter setting. A directory look-up using the organizational hierarchy is performed to determine the hierarchy and access rights of the session participants when an instant messaging session is requested. From the access rights, it may be determined which users may contact a particular instant messaging user, how the user may be seen by the other users, and the manner in which the user may be discovered by the other users. User relationships may be defined in look-up directories. Client software may perform a directory lookup against the sending and receiving users when a message is to be delivered. Users may configure certain additional actions to be taken when the two users in question have a given relationship (i.e., if manager-to-employee message, then priority=priority+10 & queue=Superior_Communcation; if employee-to-manager, then priority=5; if teammember-to-teammember, then queue=Primary_Work; if user have no relation (No_Relation), then priority=priority−1).

In an illustrative embodiment, a user's superior may be granted access rights to unblock instant messaging communication, even when the employee has filtered all users from initiating a messaging session with the user. In a similar fashion, the management hierarchy may be established such that the superior's superior has even greater access rights. Thus, the employee's filter settings may be overridden by the employee's manager, and the manager's manager as well. However, the employee may not override the manager's filter settings, or any other superior with greater authority than the user.

Figure 8:
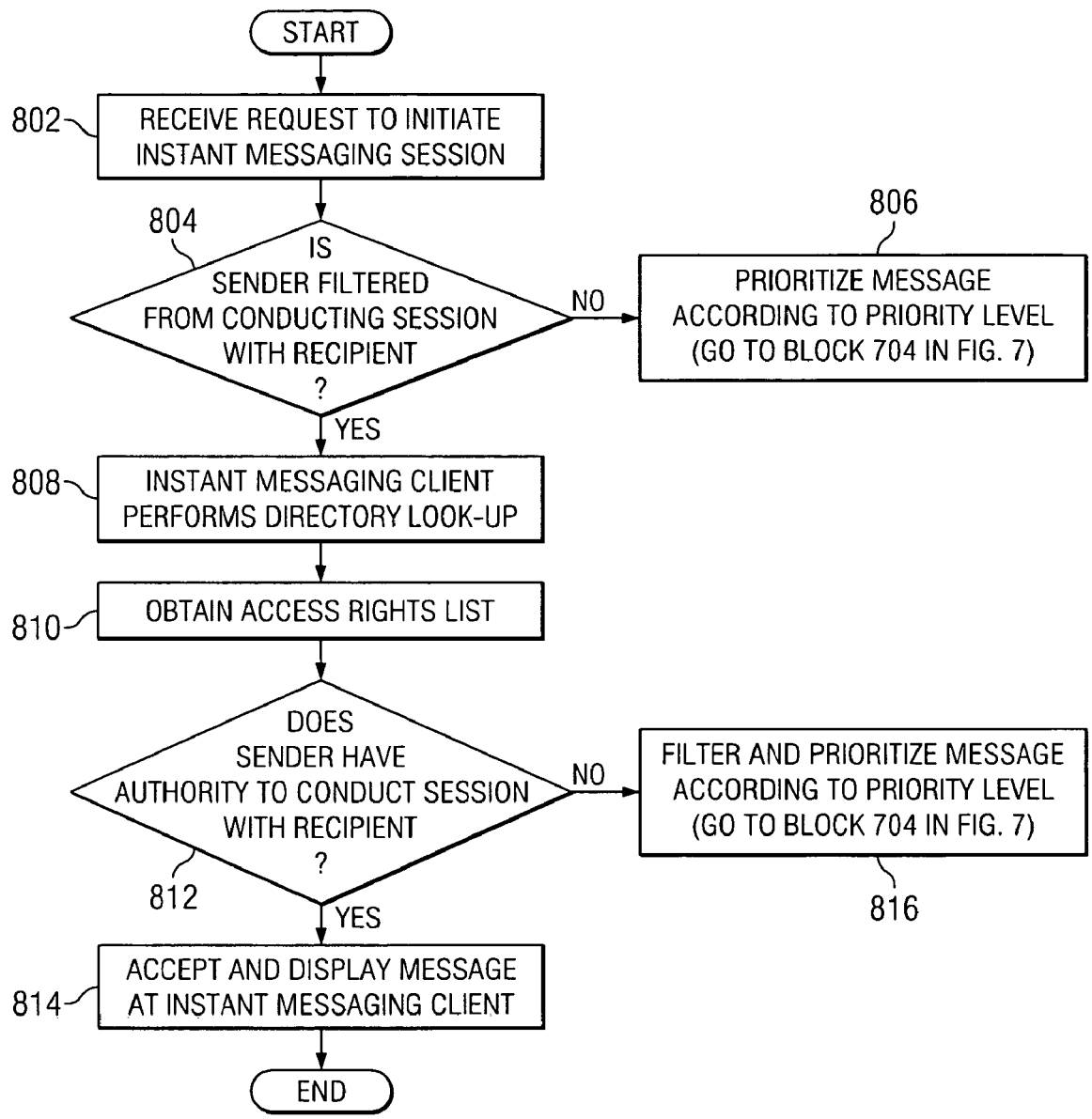
FIG. 8 is a flowchart of a process for overriding the instant messaging filters at an instant messaging client in accordance with a preferred embodiment of the present invention.

Turning next to FIG. 8, a flowchart of a process for overriding the instant messaging filters at an instant messaging client is depicted in accordance with a preferred embodiment of the present invention. The process illustrated in FIG. 8 may be implemented in an instant messaging application, such as instant messaging application 500 in FIG. 5.

The process begins by receiving a request for initiating an instant messaging session (step 802). A determination is made whether the sender is filtered from conducting an instant messaging session with the recipient (step 804). If so, the instant messaging client performs a directory look-up (step 808). This step is performed in order to establish the hierarchy and access rights of the session participants. Based on the directory look-up, an access rights list is obtained (step 810), which provides a list of users that may contact an instant messaging user. The access rights list also provides information regarding how the user may be seen to the messaging participants, and the manner in which other participants may discover the user. A determination is then made as to whether the user initiating the instant messaging session has the authority to conduct a messaging session with the recipient (step 812). If the initiating user has such access rights, the message is accepted by the messaging client and displayed to the recipient (step 814). Turning back to step 804, if it is determined that the sender is not filtered from conducting a messaging session with the recipient, the message is filtered and prioritized according to priority content (step 816), in a manner consistent with the process beginning in block 704 in FIG. 7. Similarly, turning back to step 808, if it is determined that the sender does not have appropriate access rights, the message is filtered and prioritized according to priority content (step 812), also in a manner consistent with the process beginning in block 704 in FIG. 7.

Thus, the present invention provides an improved method, apparatus, and computer instructions for filtering and prioritizing instant messaging threaded conversations in an instant messaging system based on thread content. In these examples, a user may selectively filter messages from other participants based on the thread subjects of the incoming messages. A user may also configure the instant messaging client to filter and prioritize messages from other participants based on the thread subjects of the incoming messages. In this manner, an advantage is provided over current instant messaging systems by allowing a user to filter and prioritize incoming messages based on the content of the messages.

The present invention also allows a participant initiating a thread of conversation to override filter settings on a messaging client. The authority to override settings may be predicated on the establishment of an organizational hierarchy based on a user selection or an external list, such as a corporate telephone directory. As a result, the participant, having some authority or rights to override the recipient's instant messaging settings, may be allowed to conduct a messaging session with the recipient.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for filtering and prioritizing threaded conversations in an instant messaging client, comprising:
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable code to
    receive a request for an instant messaging session;
    analyze a message in the request for an instant messaging session to determine a thread content of the message;
    use filtering and prioritizing settings set by a user of the instant messaging client to determine a priority level of the message based on the thread content of the message, wherein the filtering and prioritizing settings in the instant messaging client are overridden if a user requesting the instant messaging session has appropriate access rights to override the filtering and priority settings in the instant messaging client; and
    display the message at the instant messaging client based on the priority level.

2. The data processing system of claim 1, wherein the processing unit further executes the computer usable code to:
    route the message to an instant messaging window in the instant messaging session based on the thread content and priority level of the message.

3. The data processing system of claim 1, wherein displaying the message at the instant messaging client according to priority level includes displaying a message with a high priority level in a primary instant messaging window.

4. The data processing system of claim 1, wherein displaying the message at the instant messaging client according to priority level includes displaying a message with a lower priority level in a secondary instant messaging window.

5. The data processing system of claim 1, wherein the filtering and prioritizing settings for the instant messaging client are updated on a periodic basis.

6. The data processing system of claim 1, wherein the thread content of the message is used to determine a manner of displaying the message to the recipient.

7. The data processing system of claim 1, wherein the thread content of the message is determined using an artificial intelligent or semantic analysis.

8. The data processing system of claim 1, wherein analyzing the message is performed prior to final delivery and display of the message at the instant messaging client.

9. The data processing system of claim 1, wherein the access rights to override the filtering and prioritizing settings in the instant messaging client are based on a relationship between the user of the instant messaging client and the user requesting the instant messaging session as defined in an organizational directory.

10. The data processing system of claim 9, wherein the organizational directory includes one of a family hierarchy, friend hierarchy, or corporate hierarchy.

11. The data processing system of claim 9, wherein the organizational directory is a corporate telephone directory.

12. The data processing system of claim 1, wherein the processing unit further executes the computer usable code to
    open an additional instant messaging window for each additional message received in response to receiving additional messages at the instant message client; and
    reorder the instant messaging windows based on the priority level of each message.

13. A computer program product encoded in a computer storage medium for filtering and prioritizing threaded conversations in an instant messaging client, comprising:
    computer usable program code for receiving a request for an instant messaging session;
    computer usable program code for analyzing a message in the request for an instant messaging session to determine a thread content of the message;
    computer usable program code for using filtering and prioritizing settings set by a user of the instant messaging client to determine a priority level of the message based on the thread content of the message, wherein the filtering and prioritizing settings in the instant messaging client are overridden if a user requesting the instant messaging session has appropriate access rights to override the filtering and priority settings in the instant messaging client; and
    computer usable program code for displaying the message at the instant messaging client based on the priority level.

14. The computer program product of claim 13, further comprising:
    computer usable program code for routing the message to an instant messaging window in the instant messaging session based on the thread content and priority level of the message.

15. The computer program product of claim 13, wherein displaying the message at the instant messaging client according to priority level includes displaying a message with a high priority level in a primary instant messaging window.

16. The computer program product of claim 13, wherein displaying the message at the instant messaging client according to priority level includes displaying a message with a lower priority level in a secondary instant messaging window.

17. The computer program product of claim 13, wherein the filtering and prioritizing settings for the instant messaging client are updated on a periodic basis.

18. The computer program product of claim 13, wherein the thread content of the message is used to determine a manner of displaying the message to the recipient.

19. The computer program product of claim 13, wherein the thread content of the message is determined using an artificial intelligent or semantic analysis.

20. The computer program product of claim 13, wherein the analyzing step is performed prior to final delivery and display of the message at the instant messaging client.

21. The computer program product of claim 13, wherein the access rights to override the filtering and prioritizing settings in the instant messaging client are based on a relationship between the user of the instant messaging client and the user requesting the instant messaging session as defined in an organizational directory.

22. The computer program product of claim 21, wherein the organizational directory includes one of a family hierarchy, friend hierarchy, or corporate hierarchy.

23. The computer program product of claim 21, wherein the organizational directory is a corporate telephone directory.

24. The computer program product of claim 13, further comprising:
 computer usable code for opening an additional instant messaging window for each additional message received in response to receiving additional messages at the instant message client; and
 computer usable code for reordering the instant messaging windows based on the priority level of each message.

* * * * *